(12) United States Patent
Ohta et al.

(10) Patent No.: US 7,405,797 B2
(45) Date of Patent: Jul. 29, 2008

(54) FLAT-TYPE LIGHT SOURCE APPARATUS, LIQUID CRYSTAL DISPLAY APPARATUS USING THE SAME, AND METHOD OF INSPECTING THE LIQUID CRYSTAL DISPLAY

(75) Inventors: Hisashi Ohta, Nishigoshi-machi (JP); Kenji Teramoto, Nishigoshi-machi (JP); Takuya Monden, Nishigoshi-machi (JP)

(73) Assignee: Mitsubishi Electric Corporation, Tokyo (JP)

( * ) Notice: Subject to any disclaimer, the term of this patent is extended or adjusted under 35 U.S.C. 154(b) by 69 days.

(21) Appl. No.: 10/200,177

(22) Filed: Jul. 23, 2002

(65) Prior Publication Data

US 2003/0071933 A1    Apr. 17, 2003

(30) Foreign Application Priority Data

Oct. 17, 2001   (JP) .............................. 2001-318953

(51) Int. Cl.
*G02F 1/1345* (2006.01)
(52) U.S. Cl. ....................................... 349/149; 349/152
(58) Field of Classification Search .................. 349/33, 349/65, 69, 149–152; 313/506; 362/600, 362/630–634
See application file for complete search history.

(56) References Cited

U.S. PATENT DOCUMENTS

| | | | | | |
|---|---|---|---|---|---|
| 3,914,021 A | * | 10/1975 | Nishimura | ................... | 349/58 |
| 5,671,029 A | * | 9/1997 | Haruki | ........................ | 349/96 |
| 5,745,208 A | * | 4/1998 | Grupp et al. | ................ | 349/153 |
| 5,845,035 A | * | 12/1998 | Wimberger-Friedl | ........ | 385/129 |
| 5,859,628 A | * | 1/1999 | Ross et al. | ................... | 345/173 |
| 5,913,594 A | * | 6/1999 | Iimura | .......................... | 362/31 |
| 5,943,108 A | * | 8/1999 | Hiyama et al. | .............. | 349/106 |
| 6,162,654 A | * | 12/2000 | Kawabe | ....................... | 438/30 |
| 6,175,396 B1 | * | 1/2001 | Kim et al. | .................... | 349/58 |
| 6,181,391 B1 | * | 1/2001 | Okita et al. | ................... | 349/65 |
| 6,201,586 B1 | * | 3/2001 | Nakayama | ................... | 349/58 |
| 6,346,932 B1 | * | 2/2002 | Maeda | ......................... | 345/90 |
| 6,380,998 B1 | * | 4/2002 | Arai | ........................... | 349/152 |
| 6,441,551 B1 | * | 8/2002 | Abe et al. | .................... | 313/503 |
| 6,441,874 B1 | * | 8/2002 | Saito et al. | .................... | 349/70 |
| 6,474,823 B1 | * | 11/2002 | Agata et al. | ................... | 362/26 |
| 6,490,016 B1 | * | 12/2002 | Koura | ......................... | 349/58 |
| 6,624,857 B1 | * | 9/2003 | Nagata et al. | ................. | 349/54 |

FOREIGN PATENT DOCUMENTS

| | | | |
|---|---|---|---|
| JP | 08-076121 | | 3/1996 |
| JP | 11086623 A | * | 3/1999 |
| JP | 2000-182421 | | 6/2000 |
| JP | 2000-305101 | | 11/2000 |

* cited by examiner

*Primary Examiner*—Thien M. Le
*Assistant Examiner*—Kumiko C. Koyama
(74) *Attorney, Agent, or Firm*—Oblon, Spivak, McClelland, Maier & Neustadt, P.C.

(57) ABSTRACT

A lamp lighting terminal which is a conductive pad connected to a power supply terminal of a lamp is mounted on a surface opposite to a light emitting surface of a flat light source apparatus. Then, a terminal of a inspection device is brought into contact with the lamp lighting terminal to light up a liquid crystal display apparatus, thereby allowing inspection to be carried out. The flat light source apparatus may be provided with a light guide inputting lights from a light source through the side to output the light through one surface. In this configuration, inspection work at the time of lighting inspection of a liquid crystal display is simplified, and a high-quality liquid crystal display can be obtained.

11 Claims, 5 Drawing Sheets

FLAT-TYPE LIGHT SOURCE APPARATUS, LIQUID CRYSTAL DISPLAY APPARATUS USING THE SAME, AND METHOD OF INSPECTING THE LIQUID CRYSTAL DISPLAY

BACKGROUND OF THE INVENTION

1. Field of the Invention

The present invention relates to flat-type light source apparatus and its inspection method which are especially suitable for application to liquid crystal display apparatus.

2. Related Background Art

FIG. 7 shows an exploded perspective view of a conventional liquid crystal display apparatus. The liquid crystal display apparatus shown in FIG. 7 is provided with a liquid crystal panel 1, a frame 2, a flat-type light source apparatus (backlight) 3, a connector 5, a conductive wire 6, and a circuit substrate 7. The conventional liquid crystal display apparatus has structure that the liquid crystal panel 1 is sandwiched between the frame 2 which is a box of metal, for example, and the flat-type light source apparatus 3. In the conventional liquid crystal display apparatus, the flat-type light source apparatus 3 arranged in the opposite of a display surface of the liquid crystal panel 1 emits lights, and then the circuit substrate 7 outputs signals to change transmissivity of each pixel in the liquid crystal panel 1, thereby displaying images on the liquid crystal panel 1. Therefore, in transimissive liquid crystal display apparatus, it is necessary to arrange flat-type light source apparatus in the opposite of a display surface of the liquid crystal panel.

FIG. 8 shows a schematic wiring diagram of a light source, such as lamp, used in a flat-type light source apparatus of a conventional liquid crystal display apparatus. The light source shown in FIG. 8 is provided with a connector 5, a conductive wire 6, a lamp 12 which is constituted of a fluorescence luminescence tube and the like, and a power supply terminal of the lamp 13. The lamp 12, which is a light source, is electrically connected to an inverter and he like via the connector 5 through the conductive wire 6 connected to the power supply 13 at its both ends by soldering for example, thereby receiving electric current to emit lights.

Also, another conventional liquid crystal display apparatus is disclosed in Japanese Patent Application Laid-Open No. 2000-305101, for example. FIG. 9 shows an exploded perspective view of the conventional liquid crystal display apparatus having a liquid crystal panel 1, a backlight (flat-type light source apparatus) 3, a circuit substrate 7, a glass plate 17a and 17b, an electrode terminal 18 of a panel drive, an electrode terminal 19a and 19b of the backlight, an electrode terminal 21a and 21b, a top face 22 of the backlight (flat-type light source apparatus), a signal wire 23 of the panel drive, a signal wire 24a and 24b of a backlight lighting control, and an alignment mark 25a and 25b. In FIG. 9, the electrode terminal 19a and 19b of the backlight are located on the edge of one side of the glass plate 17a of the liquid crystal panel 1, the signal wire 24a and 24b of the backlight lighting control which control the lighting of the backlight are on the circuit substrate 7, and the electrode terminal 21a and 21b on the backlight 3 and the signal wire 24a and 24b of the backlight lighting control on the circuit substrate 7 are electrically connected to the electrode terminal 19a and 19b of the backlight located on the glass plate 17a.

In this configuration, at the same time that the electrode terminal of the panel drive on the edge of one side of the glass plate of the liquid crystal panel is connected to the signal wire of the panel drive on the circuit substrate, the electrode terminal of a backlight can be connected to the signal wire of the backlight lighting control, thereby improving operativity.

However, the above mentioned conventional liquid crystal display apparatus have the following problems. First, in the conventional liquid crystal display apparatus shown in FIG. 7, when carrying out inspections such as lighting inspection for testing display performance after the flat-type light source apparatus has been incorporated to the liquid crystal display apparatus, a connector to input signals of inspection display and the connector 5 to supply the flat-type light source apparatus with electric current are to be connected to the liquid crystal display apparatus. Recently, however, in order to meet the needs of the market for a higher quality and brightness, liquid crystal display apparatus have pixels of finer pitch in a liquid crystal panel which brings a higher resolution, more complicated signal control of a liquid crystal panel, and/or more lamps used in a flat-type light source apparatus. As a result, the number of connecting sections or the connector 5 increases as signal input cables increase, and therefore, connecting work necessary for lighting up a liquid crystal display apparatus when inspecting liquid crystal display apparatus at the production stage become complicated. Consequently, the conventional crystal display has the problem that inspection itself becomes heavy load or can cause to deterioration of products since connecting error in inspection may damage a connector.

Also, the conventional liquid crystal display apparatus shown in FIG. 9 has the same problem. Though the liquid crystal display apparatus in FIG. 9 is provided with the electrode terminal 21a and 21b on the backlight (flat-type light source apparatus) 3, they are located on a light emitting surface of the flat-type light source apparatus, and therefore it is difficult to bring terminals of an inspection device into contact with the above electrode terminals at the time of, for example, lighting inspection after the flat-type light source apparatus has been incorporated to the liquid crystal display apparatus. Accordingly, the conventional liquid crystal display apparatus shown in FIG. 9 also has the problem that connecting work in lighting inspection is complicated, thus making inspection itself be a severe burden or cause to deterioration of products in the event of connecting error causing damage to a connector.

SUMMARY OF THE INVENTION

The present invention has been accomplished to solve the above problem, and an object of the present invention is thus to provide high-quality flat-type light source apparatus and liquid crystal display apparatus by simplifying inspection work.

A first flat-type light source apparatus according to the present invention is a flat board light source apparatus having light emitting means for outputting lights from a light source through one surface and housing means for containing the light source, wherein a conductive pad connected to a power supply terminal of the light source is mounted on a surface other than the above mentioned surface.

A second flat-type light source apparatus according to the present invention is the first flat-type light source apparatus wherein the conductive pad is mounted on a surface opposite to the above mentioned light emitting surface.

A third flat-type light source apparatus according to the present invention is the first or second flat-type light source apparatus, wherein the light emitting means has a light guide which inputs lights from the light source through the side and then outputs the lights through one surface.

A fourth flat-type light source apparatus according to the present invention is the third flat-type light source apparatus, wherein the light source is positioned close to at least one side of the light guide.

A liquid crystal display apparatus according to the present invention is a liquid crystal display apparatus having one of the first to forth flat-type light source apparatus, and a liquid crystal panel with liquid crystal filled between two insulating substrates facing each other which is located on one surface of the flat-type light source apparatus.

A method of inspecting a liquid crystal display apparatus according to the present invention is a inspection method, wherein the light source is lit up by bringing a power supply terminal of an inspection device into contact with the conductive pad mounted on a surface other than the above mentioned surface of the flat-type light source apparatus in above-mentioned liquid crystal display apparatus.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
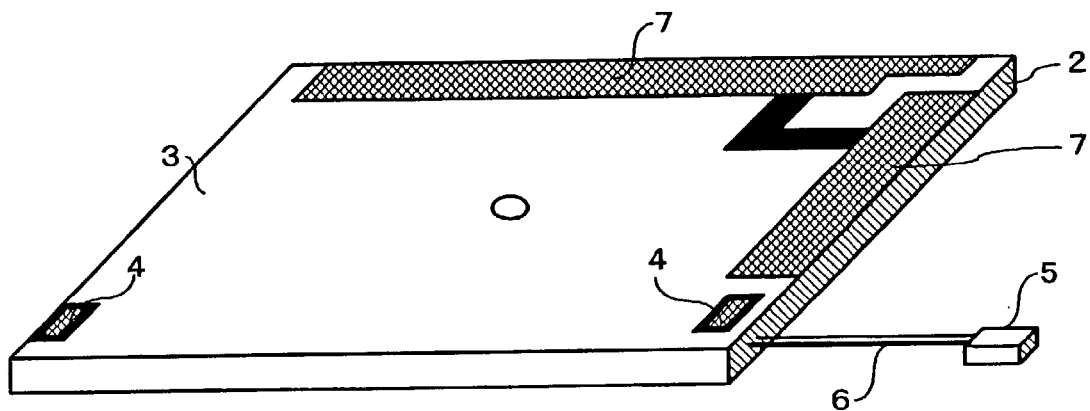
FIG. 1 is a perspective view of a flat-type light source apparatus and a liquid crystal display apparatus according to a first embodiment of the present invention.
Figure 3:
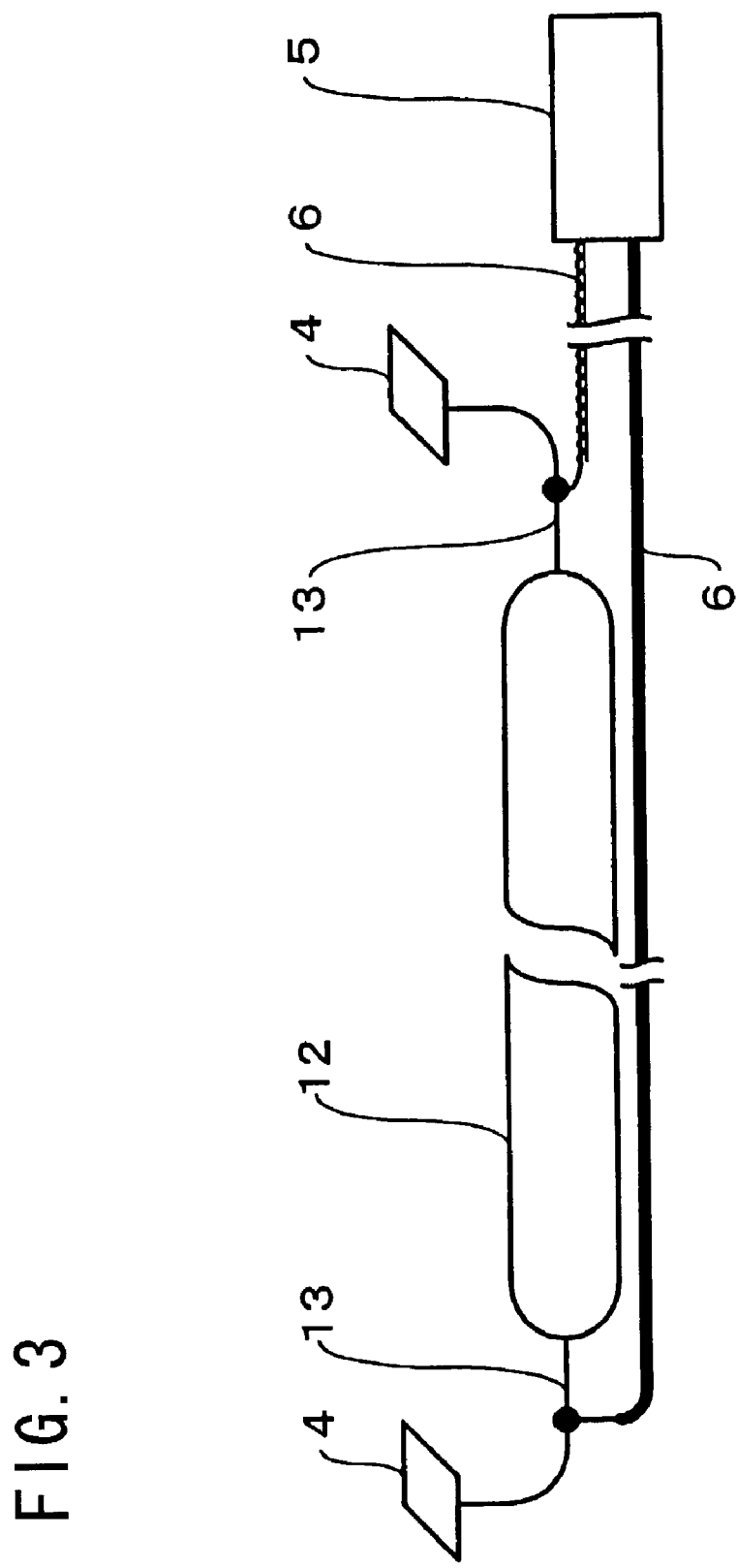
FIG. 3 is a schematic wiring diagram of a lamp of the flat-type light source apparatus according to the first embodiment of the present invention.
Figure 4:
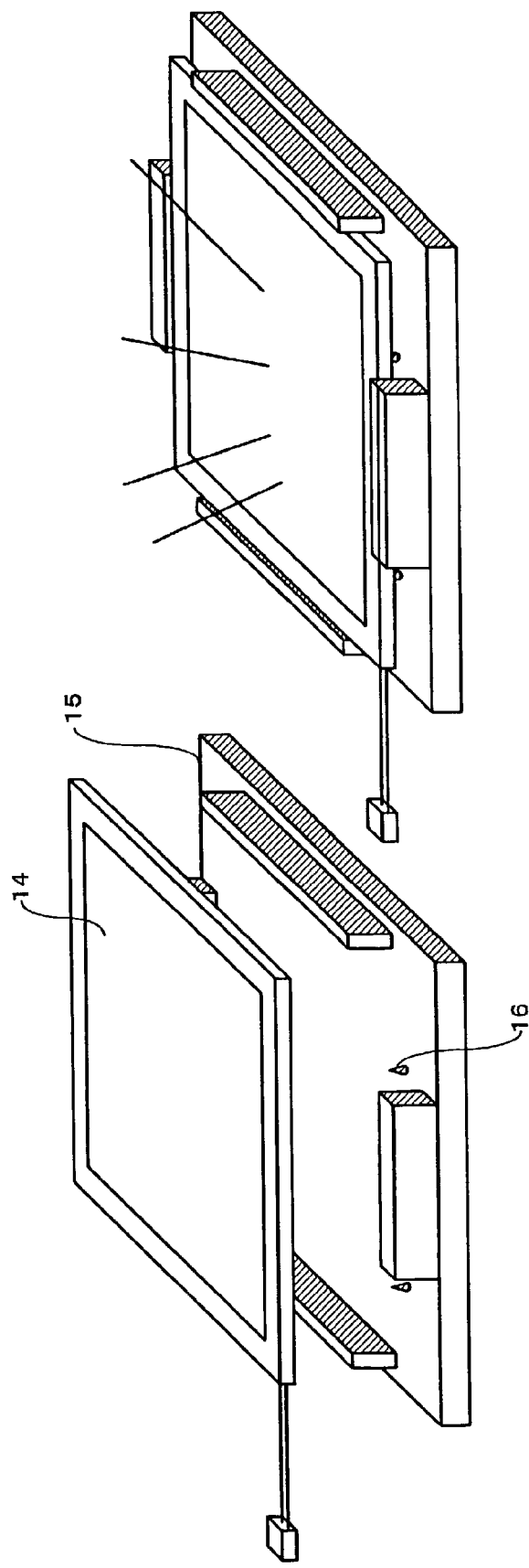
FIG. 4A is a schematic perspective view of the liquid crystal display apparatus according to the first embodiment of the present invention at time of lighting inspection (not lighting-up).
FIG. 4B is a schematic perspective view of the liquid crystal display apparatus according to the first embodiment of the present invention at time of lighting inspection (lighting-up).

A first embodiment of the present invention will be described hereinafter with reference to FIGS. 1 to 4. FIG. 1 is a perspective view of a flat-type light source apparatus and a liquid crystal display apparatus, FIG. 2 is an exploded perspective view of the flat-type light source apparatus, FIG. 3 is a schematic wiring diagram of a lamp of the flat-type light source apparatus, FIG. 4A is a schematic perspective view of the liquid crystal display apparatus at time of lighting inspection (not lighting-up), and FIG. 4B is a schematic perspective view of the liquid crystal display apparatus at time of lighting inspection (lighting-up), all of which are according to the first embodiment of the present invention.

In FIGS. 1 to 4, a reference symbol 2 denotes a box-frame, 3 denotes a flat board light source apparatus (backlight), 4 denotes a lamp lighting terminal, 5 denotes a connector, 6 denotes a conductive wire, 7 denotes a circuit substrate, 8 denotes an optical sheet, 9 denotes a light guide, 10 denotes a reflective sheet, 11 denotes a mold frame, 12 denotes a lamp comprised of a fluorescence luminescence tube and the like, 13 denotes a power supply terminal of the lamp, 14 denotes a liquid crystal display apparatus, 15 denotes an inspection device, and 16 denotes a terminal of the inspection device.

As shown in the FIG. 1, the lamp lighting terminal 4 which is a conductive pad connected to a power supply terminal of the lamp is mounted on a surface opposite to a light emitting surface of the flat-type light source apparatus 3. In FIG. 1, the conductive pad is mounted on the back side of the mold flame which will be detailed later. FIG. 2 shows an exploded perspective view of the flat-type light source apparatus 3 which is comprised of the reflective sheet arranged on the mold frame 11 being housing means for containing the lamp 12, the light guide 9 being light emitting means for outputting lights from a light source through one surface arranged above, and the optical sheet arranged further above as needed.

Figure 2:
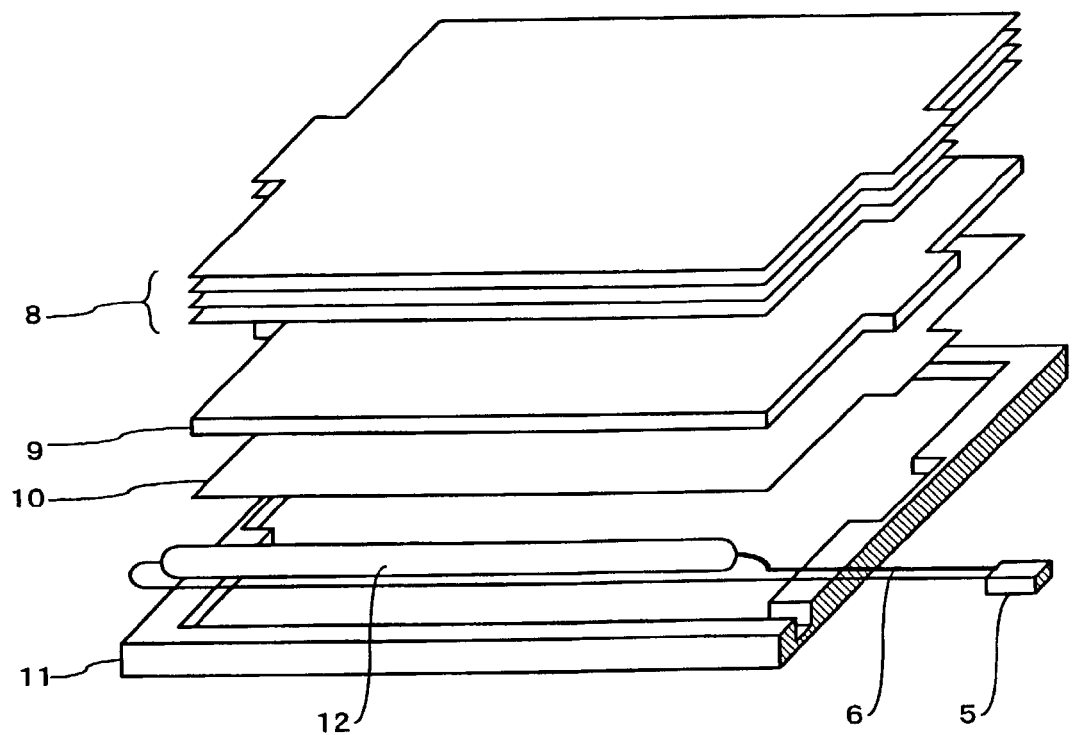
FIG. 2 is an exploded perspective view of the flat-type light source apparatus according to the first embodiment of the present invention.

In FIG. 2, single lamp 12 is located close to one side of the light guide 9. FIG. 1 and FIG. 2 shows an edge light type liquid crystal display apparatus inputting lights from a lamp through the side of a light guide and outputting the lights through one surface.

In the liquid crystal display apparatus 14, a liquid crystal panel with liquid crystal filled between two insulating substrates facing each other is fixed to a light emitting surface of the flat-type light source apparatus 3 with a box-frame made of metal, for example. In FIG. 2, the lamp lighting terminal 4 is mounted on the back side of the mold frame 11 which is the side where the reflective sheet, light guide, and optical sheet are not located, while not shown. FIG. 3 is a wiring diagram schematically showing a lamp of the flat-type light source apparatus 3. In FIG. 3, the power supply terminal of the lamp 13 is connected via the conductive wire 6 to the connector 5 which extends to the outside of the flat-type light source apparatus 3. Also, the terminal 13 is connected to the lamp lighting terminal 4 which is located on the back side of a light emitting surface of the flat-type light source apparatus 3.

FIG. 4 illustrates a method of inspecting the liquid crystal display apparatus, and as shown in FIG. 4A, the inspection device 15 is provided with the terminal of the inspection device 16 in a position corresponding to the lamp lighting terminal 4 mounted on the back side of the liquid crystal display apparatus 14. As shown in FIG. 4B, the liquid crystal display apparatus 14 lights up by bringing the terminal of the inspection device 16 into contact with the lamp lighting terminal 4 of the liquid crystal display apparatus 14, allowing to carry out inspection.

In this configuration where there is no need for pushing into or pulling out the connector at the time of lighting inspection of the liquid crystal display apparatus and thus simplifying the inspection work, it is feasible to increase efficiency of the work and also to prevent damage to the connector, thereby producing high-quality liquid crystal display apparatus.

Figure 5:
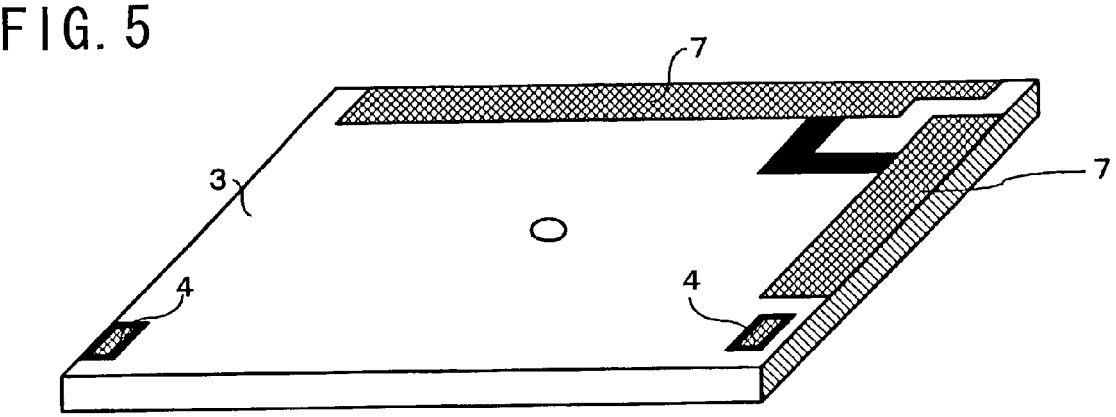
FIG. 5 is a perspective view of the flat-type light source apparatus and the liquid crystal display apparatus according to a second embodiment of the present invention.
Figure 6:
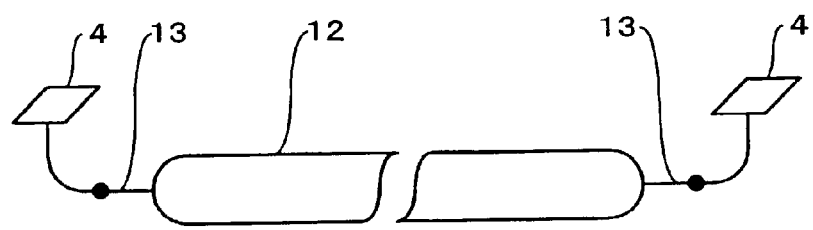
FIG. 6 is a schematic wiring diagram of a lamp of the flat-type light source apparatus according to the second embodiment of the present invention.
Figure 7:
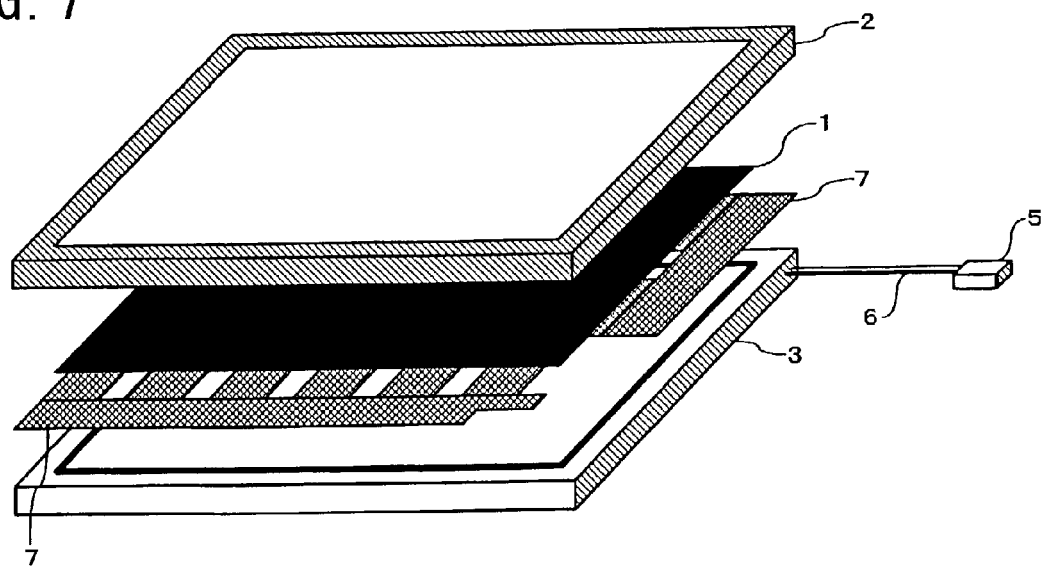
FIG. 7 is an exploded perspective view of a conventional liquid crystal display apparatus.
Figure 8:
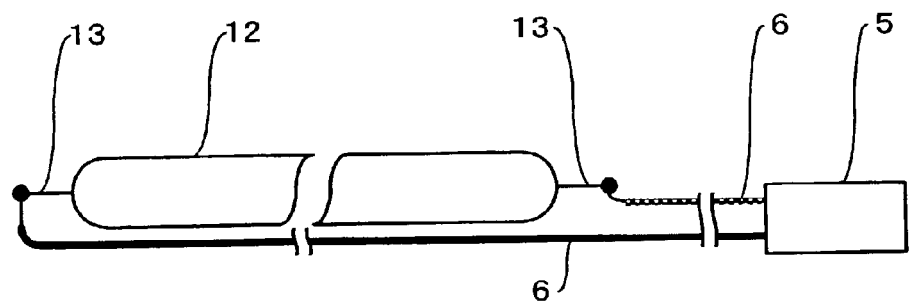
FIG. 8 is a schematic wiring diagram of a power source of a conventional flat-type light source apparatus.
Figure 9:
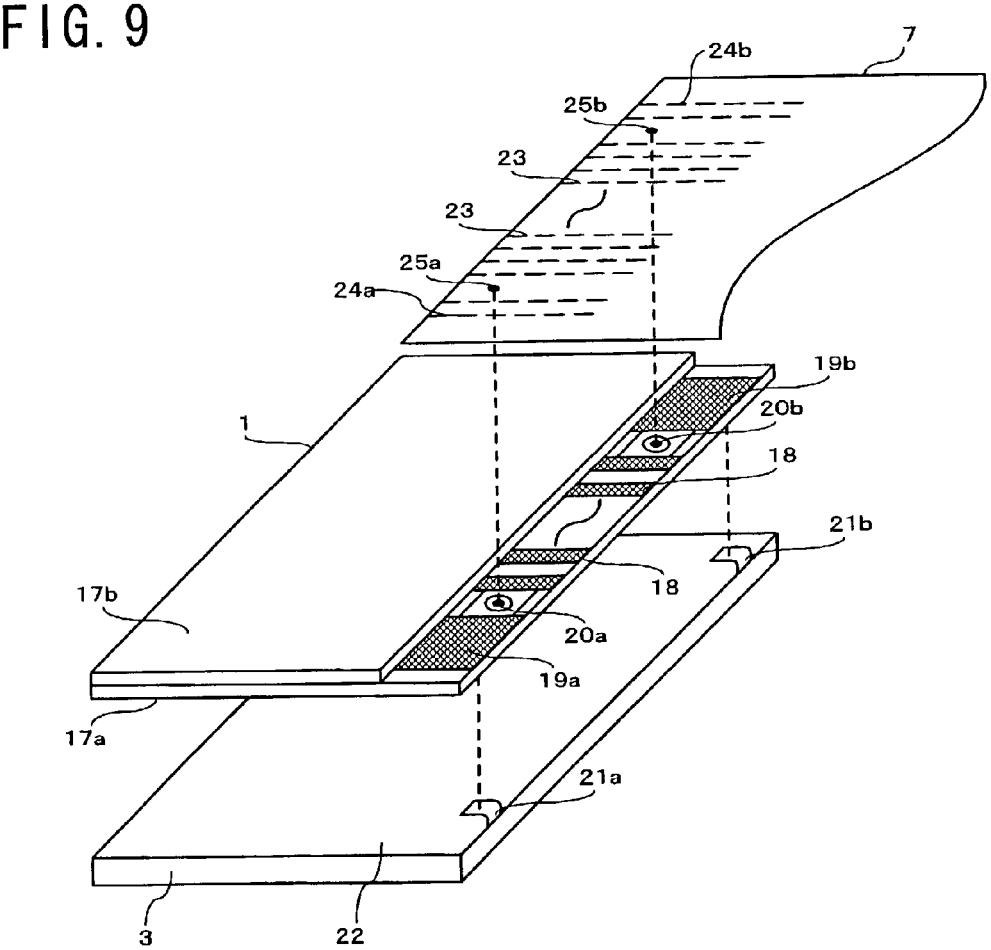
FIG. 9 is an exploded perspective diagram of another conventional liquid crystal display apparatus.

A second embodiment of the present invention will be described hereinafter with reference to FIGS. 5 and 6. FIG. 5 is a perspective view of the flat-type light source apparatus and the liquid crystal display apparatus, and FIG. 6 is a schematic wiring diagram of a lamp of the flat-type light source apparatus, both according to the second embodiment of the present invention. In FIGS. 5 and 6, the same component as in FIGS. 1 to 4 are denoted by the same reference symbols, and the difference will be described hereinbelow. The second embodiment is different from the first embodiment in which, as shown in FIG. 5, while the lamp lighting terminal 4 which is a conductive pad connected to a power supply terminal of the lamp is mounted on a surface opposite to a light emitting surface of the flat-type light source apparatus 3, the conductive wire 6 and the connector 5 do not extend to the outside of the flat-type light source apparatus 3. Accordingly, as shown in FIG. 6, the power supply terminal of the lamp 13 is connected only to the lamp lighting terminal 4 which is located on the back side of a light emitting surface of the flat-type light source apparatus 3 as in FIG. 5.

As explained in the foregoing, the configuration according to the second embodiment brings effects of increasing efficiency of the inspection work and preventing damage to the connector like the first embodiment. Moreover, the configuration also has an effect of ensuring the safe connection because the conductive wire 6 and the connector 5 are not provided, and thus electric power is supplied through the lamp lighting terminal when the liquid crystal display apparatus is brought to be incorporated into displaying means such as a monitor; therefore the conductive wire need not be extended from the flat-type light source apparatus into the liquid crystal display apparatus, which eliminates the possibility of breaking the conductive wire.

The above-mentioned first and second embodiments describe a case where the lamp lighting terminals 4 are mounted in two spots on a surface opposite to a light emitting surface of the flat-type light source apparatus; however, it is not restricted thereto. For example, the surface on which the lamp lighting terminals 4 are mounted may be a side surface as long as the lamp lighting terminal is easily brought into contact with the terminal of the inspection device. Also, though the first and second embodiments describe a case where the flat board light source apparatus 3 is provided with single lamp 12, the lamp may be plural, for example, two lamps can be located across the light guide from each other, and in this case, the lamp lighting terminal should be arranged so as to correspond with the power source terminal of each lamp, on a surface other than a light emitting surface. Further, in a case where several lamps are arranged, the same pole of electrode terminals of different lamps can be common lamp lighting terminal. Though the above-mentioned first and second embodiments show the lamp lighting terminal 4 of nearly square, it may be shaped for corresponding to various shapes of sections connected to the lamp lighting terminal 4, such as the terminal of the inspection device 16 and the power source terminal of the lamp to the side of the displaying means. For example, one terminal may have a shape of concavity and the other may have convexity to fit to each other. Also, in a case where electric power from displaying means is supplied by the lamp lighting terminal as in the second embodiment, the lamp lighting terminal of the liquid crystal display apparatus may have thread cutting in a part corresponding to a screw for incorporating the liquid crystal display apparatus into displaying means in order that electric power can be supplied with the lamp through the screw, thereby allowing more positive connection.

As in the foregoing, while the above-mentioned first and second embodiments explain a case where the flat-type light source apparatus with a conductive pad on a surface other than a light emitting surface is provided for an edge backlight type liquid crystal display apparatus, it is not restricted thereto. For example, the flat-type light source apparatus may also be provided for a backlight type liquid crystal display apparatus. Furthermore, the same effect can be obtained when the flat-type light source apparatus is provided for any display apparatus using a flat-type light source apparatus.

As explained in the foregoing, the first flat-type light source apparatus according to the present invention is a flat board light source apparatus having light emitting means for outputting lights from a light source through one surface and housing means for containing the light source, wherein a conductive pad connected to a power supply terminal of the light source is mounted on a surface other than the above mentioned surface, thereby simplifying inspection work.

The second flat-type light source apparatus according to the present invention is the first flat-type light source apparatus wherein the conductive pad is mounted on a surface opposite to the light emitting surface, thereby simplifying inspection work.

The third flat-type light source apparatus according to the present invention is the first or second flat-type light source apparatus, wherein the light emitting means has a light guide which inputs lights from the light source through the side and then outputes the lights through one surface, thereby simplifying inspection work.

The fourth flat-type light source apparatus according to the present invention is the third flat-type light source apparatus, wherein the light source is positioned close to at least one side of the light guide, thereby simplifying inspection work.

The liquid crystal display apparatus according to the present invention is a liquid crystal display apparatus having one of the first to forth flat-type light source apparatus, and a liquid crystal panel with liquid crystal filled between two insulating substrates facing each other which is located on one surface of the flat-type light source apparatus, thereby simplifying inspection work and also improving the quality.

The method of inspecting a liquid crystal display apparatus according to the present invention is a inspection method, wherein the light source is lit up by bringing a power supply terminal of an inspection device into contact with the conductive pad mounted on a surface other than the above mentioned surface of the flat-type light source apparatus in the liquid crystal display apparatus, thereby simplifying inspection work and also obtaining high-quality liquid crystal display apparatus.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display apparatus with a back-light unit, comprising:
   a flat light source apparatus used as the back-light unit, including a light source, a light emitting unit configured to output light from said light source through a front surface, a frame for containing said light source and said light emitting unit, a conductive pad mounted on a back outer surface or a side outer surface of said frame, and a power supply terminal of said light source connected to said conductive pad to light up said light source through said conductive pad;
   a liquid crystal panel with liquid crystal filled between two insulating substrates facing each other which is fixed to a viewing side of said flat light source apparatus, and said liquid crystal panel is configured to transmit the light from said flat light source to a display surface; and an outer housing disposed to form an outer shell of the liquid crystal display apparatus, said outer housing framing said liquid crystal panel and enclosing said flat light source apparatus, wherein said conductive pad is accessible from outside of said outer housing.

2. The liquid crystal display apparatus of claim 1, wherein said light source is tubular.

3. The liquid crystal display apparatus according to claim 1, wherein back surface of said frame is an opposite surface of said front surface.

4. The liquid crystal display apparatus according to claim 3, wherein a plane containing said side surface intersects a plane containing said back surface.

5. The liquid crystal display apparatus according to claim 1, wherein said light emitting unit has a light guide which inputs light from said light source through a side to output said light through one surface.

6. The liquid crystal display apparatus according to claim 5, wherein said light source is mounted close to at least one side of said light guide.

7. A method of inspecting a liquid crystal display apparatus with a back-light unit, comprising the steps of:

preparing a liquid crystal display apparatus comprising a flat light source apparatus used as the back-light unit, including a light source, a light emitting unit configured to output light from said light source through a front surface, a frame for containing said light source and said light emitting unit, a conductive pad mounted on a back outer surface or a side outer surface of said frame, and a power supply terminal of said light source connected to said conductive pad to light up said light source through said conductive pad; a liquid crystal panel with liquid crystal filled between two insulating substrates facing each other which is fixed to a viewing side of said flat light source apparatus, and said liquid crystal panel is configured to transmit the light from said flat light source to a display surface; and an outer housing disposed form an outer shell of the liquid crystal display apparatus, said outer housing framing said liquid crystal panel and enclosing said flat light source apparatus, wherein said conductive pad is accessible from outside said outer housing;

bringing said conductive pad into contact with a power supply terminal of an inspection device placed on a outer surface of said inspection device in a position corresponding to said conductive pad; and supplying a power from said power supply terminal of said inspection device to a power supply terminal of said light source through said conductive pad to light up said light source.

8. The method according to claim 7, wherein said conductive pad corresponds to said power supply terminal of said light source, and said conductive pad is brought into contact with said power supply terminal of said inspection device.

9. The method according to claim 7, wherein said back surface of said frame is an opposite surface of said front surface.

10. The method according to claim 9, wherein a plane containing said side surface intersects a plane containing said back surface.

11. A liquid crystal display apparatus with a back-light unit, comprising:

a flat light source apparatus used as the back-light unit, including a light source, a light emitting unit configured to output light from said light source through a front surface, a frame for containing said light source and said light emitting unit, a conductive pad mounted on a back outer surface or a side outer surface of said frame, and a power supply terminal of said light source connected to said a conductive pad to light up said light source through said conductive pad;

a conductive wire connected to said power supply terminal of said light source and extended to the outside of said flat light source apparatus;

a connector connected to said conductive wire to light up said light source;

a liquid crystal panel with liquid crystal filled between two insulating substrates facing each other which is fixed to a viewing side of said flat light source apparatus, and said liquid crystal panel is configured to transmit the light from said flat light source to a display surface; and an outer housing disposed to form an outer shell of the liquid crystal display apparatus, said outer housing framing said liquid crystal panel and enclosing said flat light source apparatus, wherein said conductive pad is accessible from outside of said outer housing.

* * * * *